United States Patent [19]
Stine

[11] Patent Number: 5,207,360
[45] Date of Patent: May 4, 1993

[54] TENACIOUS BALL BAG

[76] Inventor: Chod Stine, 1119 N. 20th St., Boise, Id. 83702

[21] Appl. No.: 762,895

[22] Filed: Sep. 19, 1991

[51] Int. Cl.⁵ .................................................. B62J 11/00
[52] U.S. Cl. ................................. 224/30 A; 224/36; 224/919; 206/315.9
[58] Field of Search ............ 224/30 R, 30 A, 36, 224/41, 919, 901, 250, 253; 206/315.9, 315.91, 303, 304.2; 383/11, 16; 294/138, 149, 152, 157, 165; 2/338; 450/155, 15, 16

[56] References Cited

U.S. PATENT DOCUMENTS

| | | | |
|---|---|---|---|
| 253,211 | 2/1882 | Lanson | 224/41 |
| 555,472 | 2/1896 | Brosnan | 224/41 |
| 591,904 | 6/1897 | Weber | 224/30 R |
| 597,734 | 1/1898 | McConnell | 294/157 X |
| 610,288 | 9/1898 | Streeper | 224/36 X |
| 752,004 | 2/1904 | Simons | 224/36 |
| 3,292,831 | 12/1966 | Moen | 294/157 |
| 3,955,728 | 5/1976 | Jackson et al. | 383/11 X |
| 4,244,497 | 1/1981 | Lee | 224/919 X |
| 4,284,217 | 8/1981 | Johnston et al. | 224/30 R |
| 4,852,778 | 8/1989 | Beiser et al. | 224/36 X |

Primary Examiner—Henry J. Recla
Assistant Examiner—Glenn T. Barrett
Attorney, Agent, or Firm—Stratton Ballew Richardson

[57] ABSTRACT

The invention is a ball bag for attachment to the handlebars of a bicycle for carrying sport balls in a convenient and safe manner. The bag is made of fastened webbing with a centerpiece, three cross pieces, two angled end pieces, and four adjustable attachment straps. The relative length of the centerpiece to the end pieces, and the angles in the end pieces and between the end pieces and the attachment straps cooperate to create a tenacious, spherical interior cavity for the sport ball when the adjustable attachment straps are secured to the handlebars of a bicycle and around the sport ball.

7 Claims, 4 Drawing Sheets

TENACIOUS BALL BAG

BACKGROUND OF THE INVENTION

1. Technical Field

This invention relates to sport ball bags or carriers. More specifically, it relates to ball bags which are attachable to vehicles for convenient transport of the balls. What I have invented is a tenacious bag which is conveniently attachable to the handlebars of a bicycle.

2. background Art

There are many packs and sacks or bags available which may be adapted for carrying sport balls. These bags may be made from solid sheets of fabric, or from open lattices of netting or webbing. They may be provided with many different types of closures for securing the contents of the bag, including drawstrings, flaps with snaps and zippers, for example. Also, they may be provided with many different types of attachment means for securing the bag to the vehicle, including straps with buckles, hooks and loops and snaps. Also, many of these bags may be adapted to be attachable to the handlebars of a bicycle.

However, there remains a need for a simple, inexpensive ball bag which is conveniently and tenaciously attachable to the handlebars of a bicycle, and which safely and tenaciously secures a sport ball to the bicycle, leaving both of the rider's hands free for control and operation of the bicycle. This type of bag is what I have invented.

DISCLOSURE OF INVENTION

What I have invented is:

A ball bag comprising:

a symmetric network of fastened webbing with a center piece and three cross pieces attached at their centers at right angles in a plane with said center piece, two angled end pieces, each attached at their ends and centers to the ends of the said cross pieces, said angled end pieces being angled away from the centerpiece, and four attachment straps, each attached at one end to a junction of the ends of a cross piece and an angled end piece, said attachment straps having attachment means on their other end, wherein (a) The angle in the two angled end pieces is between about 105° and 115°, and (b) The angle of the four attachment straps relative to the angled end pieces is between about 125° and 140°.

Also, my invention includes:

The bag above wherein the angled end pieces are made from two component pieces;

wherein the attachment straps attachment means are hook and loop connectors;

wherein the angle in the two angled end pieces is about 110°; and, wherein the angle of the four attachment straps relative to the angled end pieces is about 130°.

My bag is conveniently and tenaciously attachable to the handlebars of a bicycle. Also, my bag safely and tenaciously secures a sport ball to the bicycle, as will become evident from the more detailed description which follows.

BEST MODE FOR CARRYING OUT INVENTION

Figure 1:
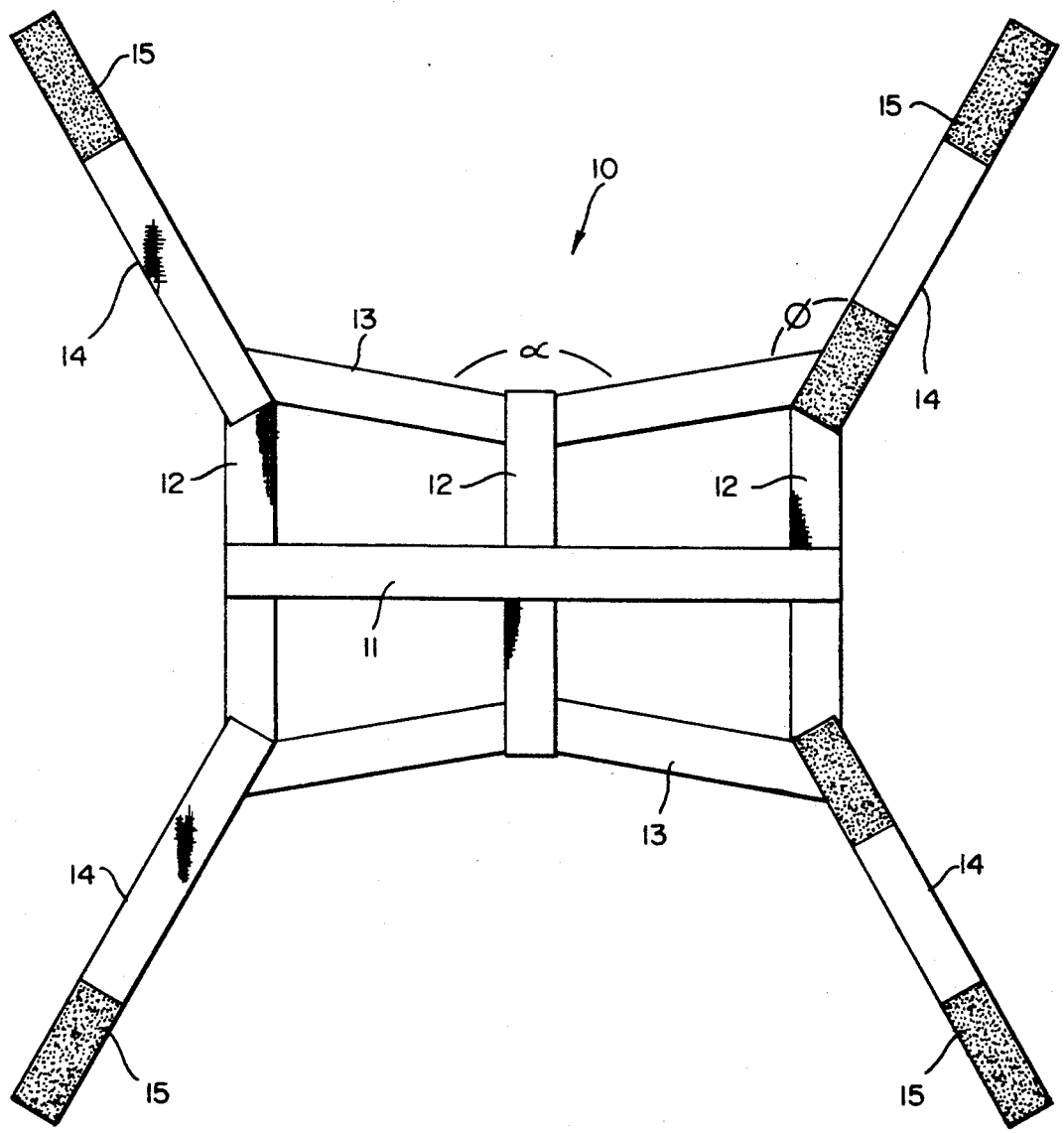
FIG. 1 is a plan view of the ball bag of my invention laid out in a plane.

Referring to FIG. 1, there is depicted generally my ball bag 10 with webbing centerpiece 11 and three webbing cross pieces 12. Two webbing angled end pieces 13 with outside angle alpha are attached at their ends and centers to the ends of the cross pieces 12. The angled end pieces 13 may be made by joining two component pieces together at the angle alpha. Generally, centerpiece 11 is about 17 ¼ inches long. Angled end pieces 13 in this case are generally from about 13 to about 16 inches long in the direction parallel to centerpiece 11, depending upon the amount of outside angle alpha. Alpha is between about 105° and 115°. This length difference of between about 10 and 25 percent between the centerpiece and the angled end pieces encourages my ball bag to curl up and create a spherical interior cavity for receiving and tenaciously holding the sport ball when the attachment straps are secured to the handlebars of the bicycle.

Four attachment straps 14 are each attached at one end to a junction of the ends of a cross piece and an angled end piece with outside angle theta. Theta is between about 125° and 140°.

Attachment straps 14 have attachment means 15 on or near their ends which are not attached to the junction of the ends of a crosspiece and an angled end piece. Preferably, attachment means 15 are adjustable in length. Preferably, attachment means 15 are hook and loop connectors, for example, VELCRO ® connectors, which may be present on both sides of the attachment straps 14.

The webbing is generally woven synthetic fabric about 1.2 mils thick and about 1½ inches wide. However, natural fabrics and other fabrication materials, like leather for example, may also be used.

The junctions of the webbing pieces are generally made by sewing the pieces together with a suitable thread. However, fabric cementing, heat-welding and other fastening techniques may also be used.

Figure 2:
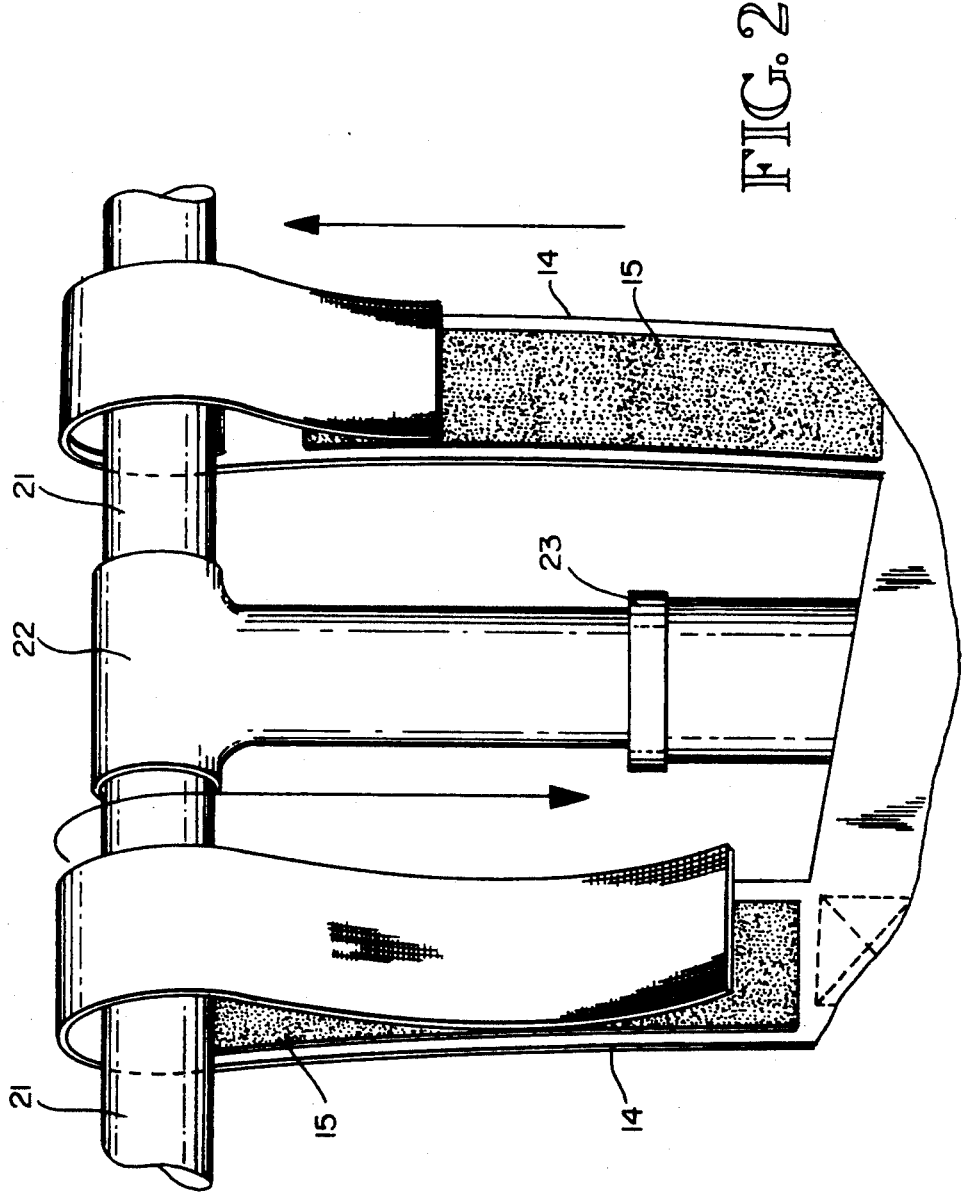
FIG. 2 is a partial, elevational view of two adjustable attachment straps of my ball bag and the handlebars of a bicycle.

Referring to FIG. 2, there is depicted two attachment straps 14 with attachment means 15 on or near their ends. The straps 14 are looped over the handlebars 21 extending from the stem 22 of a bicycle headset 23. Generally, the distance between the loops of the straps on the handlebars is from about three inches to about ten inches. The arrows in this Figure indicate the directions of adjustability in the attachment straps 14.

Figure 3:
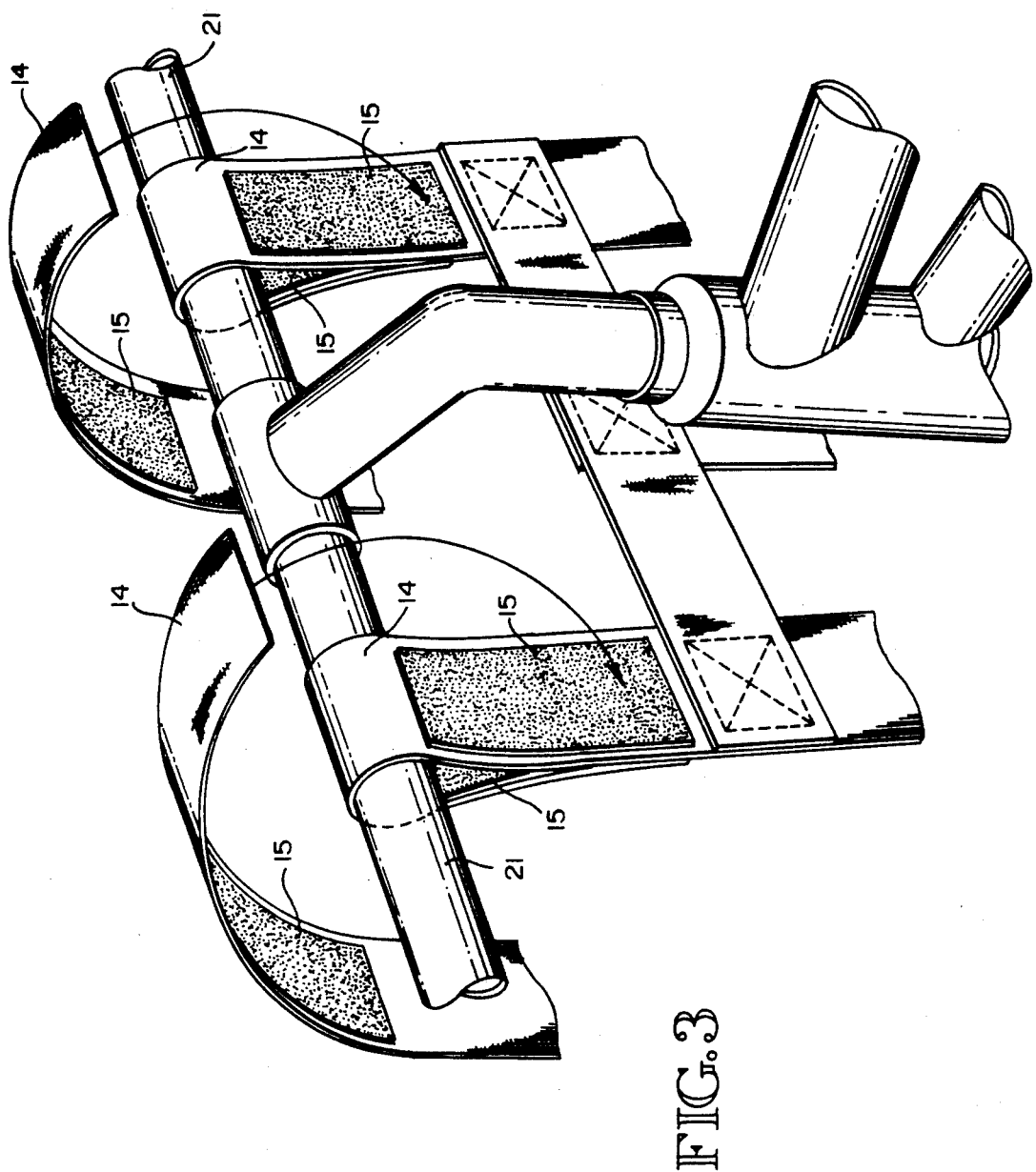
FIG. 3 is a partial, perspective view of the four attachment straps of my ball bag and the handlebars of a bicycle.

Referring to FIG. 3, there are depicted four attachment straps 14 with attachment means 15 on or near both sides of their ends. One first set of the straps 14 are looped over the handlebars and another second set are curled around to be attached to the ends of the first set. The arrows in this Figure indicate the direction for fastening the second set of attachment straps 14.

Figure 4:
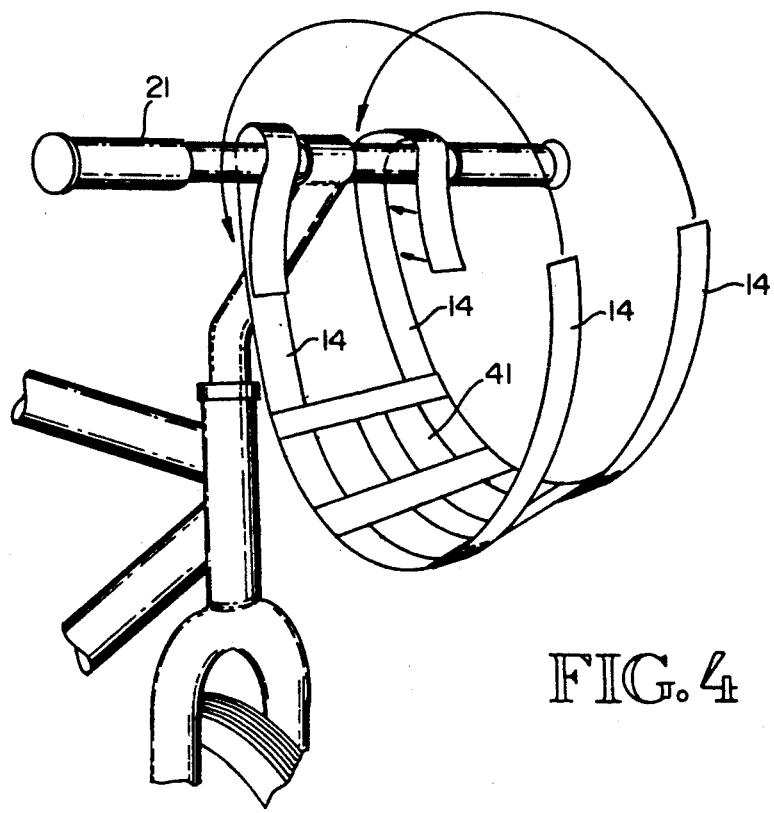
FIG. 4 is a perspective view of my bag being attached to the handlebars of a bicycle.
Figure 5:
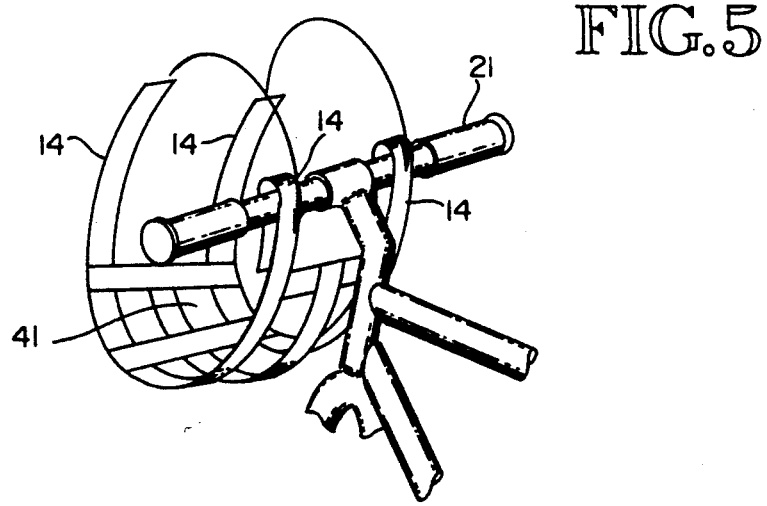
FIG. 5 is a reverse-angle view of the view of FIG. 4.

Referring to FIG. 4 and FIG. 5, there is depicted one first set of two attachment straps 14 looped over handlebar 21, and one second set of two attachment straps 14 curled around to be attached to the ends of the first set, and creating generally spherical interior cavity 41 for receiving the sport ball (not shown), which ball is laid on the network of fastened webbing as the second set of two attachment straps are curled around to be attached to the first set. The arrows in these Figures indicate the direction for fastening the second set of attachment straps 14. When these are fastened, the sport ball is securely held within spherical interior cavity.

While there is shown and described the present preferred embodiment of the invention, it is to be distinctly understood that this invention is not limited thereto but may be variously embodied to practice within the scope of the following claims.

I claim:

1. A device for carrying a ball, said device being adapted to be mounted to a handle bar assembly of a bicycle, said device comprising:

a symmetric network of fastened strapping adapted to substantially surround the ball, said network including a centerpiece and three cross pieces having first and second ends and centers, said cross pieces being attached at their centers to said center piece and being disposed at right angles with respect to said center piece, two angled end pieces each of said angled end pieces having a pair of ends, a center and an angle, such that one of said angled end pieces is attached at its ends and center to the first ends of said cross piece and the other angled end piece is attached at its ends and center to the second ends of said cross pieces wherein a junction is formed at each end of said angled end piece which is connected to an end of said cross pieces, said angled end pieces being angled away from the centerpiece, and four attachment straps, each strap having a pair of ends and being attached at one end to a junction such that an attachment strap extends from each junction, each of said attachment straps having attachment means positioned near the other end, wherein two of said attachment straps are adapted to be secured to said handlebars and the other two of said attachment straps are adapted to be secured to said two attachment straps such that said symmetric network and said end pieces form a cradle adapted for receiving said ball.

2. The device of claim 1 wherein the angled end pieces are made from two component pieces.

3. The device of claim 1 wherein the centerpiece has a length longer than the angled end pieces.

4. The device of claim 3 wherein the centerpiece is between about ten (10%) percent to twenty-five (25%) percent longer than the angled end pieces.

5. The device of claim 1 wherein the angle in the two angled end pieces is approximately between 105° and 115°.

6. The device of claim 1 wherein each attachment strap extends from said junction at an angle with respect to the angled end pieces wherein the angle approximately between 125° and 140°.

7. The device of claim 1 wherein the attachment straps attachment means are hook and loop connectors.

* * * * *